(12) United States Patent
Diederich et al.

(10) Patent No.: US 6,467,966 B1
(45) Date of Patent: Oct. 22, 2002

(54) RADIAL BEARING WITH A SLIDING BEARING-TYPE CONSTRUCTION

(75) Inventors: Ralf Diederich, Beindersheim; Horst Schaefer, Rhade; Anna Usbeck, Worms, all of (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 09/701,492

(22) PCT Filed: May 14, 1999

(86) PCT No.: PCT/EP99/03340

§ 371 (c)(1),
(2), (4) Date: Nov. 29, 2000

(87) PCT Pub. No.: WO99/63239

PCT Pub. Date: Dec. 9, 1999

(30) Foreign Application Priority Data

May 29, 1998 (DE) .......................... 198 24 128

(51) Int. Cl.⁷ .............................. F16C 33/18
(52) U.S. Cl. ................ 384/297; 384/280; 384/282; 384/907.1
(58) Field of Search .................. 384/192, 276, 384/280, 282, 296, 297, 907.1

(56) References Cited

U.S. PATENT DOCUMENTS

| 3,675,980 A |   | 7/1972  | Stiff et al. ............ 308/238 |
|-------------|---|---------|----------------------------------|
| 3,993,371 A | * | 11/1976 | Orndorff, Jr. ......... 384/297  |
| 4,080,014 A | * | 3/1978  | Riegler et al. ........ 384/202  |
| 4,717,268 A | * | 1/1988  | Orkin ................. 384/280  |
| 4,880,319 A | * | 11/1989 | Haggerty .............. 384/215  |
| 5,056,938 A | * | 10/1991 | Ahlman et al. ......... 384/276  |
| 5,112,146 A | * | 5/1992  | Stangeland ............ 384/492  |
| 5,346,316 A | * | 9/1994  | Okada et al. .......... 384/297  |
| 5,489,487 A | * | 2/1996  | Tanaka et al. ......... 384/276  |
| 5,492,415 A | * | 2/1996  | Jordens et al. ........ 384/125  |
| 5,716,143 A | * | 2/1998  | Browne et al. ......... 384/192  |
| 5,911,513 A | * | 6/1999  | Tsuji et al. .......... 384/276  |
| 5,941,647 A | * | 8/1999  | Koike et al. .......... 279/46.3 |
| 6,020,072 A | * | 2/2000  | Woydt et al. .......... 277/943  |

FOREIGN PATENT DOCUMENTS

| DE | 1 528 640   |   | 7/1970  |
|----|-------------|---|---------|
| DE | 78 36 469   |   | 5/1979  |
| DE | 31 03 868   |   | 9/1982  |
| DE | 31 13 004   |   | 10/1982 |
| DE | 31 43 384   |   | 5/1983  |
| DE | 36 02 132   |   | 7/1987  |
| DE | 39 06 889   |   | 9/1989  |
| DE | 195 19 468  |   | 11/1995 |
| DE | PS 145109   |   | 7/2002  |
| EP | 345214      | * | 5/1989  |
| EP | 0 345 214   |   | 12/1989 |
| EP | 0 426 013   |   | 5/1991  |
| EP | 0 490 235   |   | 6/1992  |
| EP | 0 492 605   |   | 7/1992  |
| EP | 0 598 923   |   | 6/1994  |
| FR | 2 162 824   |   | 7/1973  |
| FR | 2 266 820   |   | 10/1975 |
| JP | 1-220717    |   | 9/1989  |
| JP | 63-44588    | * | 9/1989  |
| JP | 2-76927     |   | 3/1990  |
| JP | 4-300788    | * | 5/1994  |
| JP | 6-147228    |   | 5/1994  |
| JP | 7-224836    |   | 8/1995  |
| WO | WO 94/12800 | * | 6/1994  |

* cited by examiner

*Primary Examiner*—Jack Lavinder
*Assistant Examiner*—Devon Kramer
(74) *Attorney, Agent, or Firm*—Crowell & Moring LLP

(57) ABSTRACT

The invention relates to a radial bearing which can be used for bearing problems in which an angular displacement occurs during operation by virtue of the elastically flexible shaping of a bearing sleeve on which an elastically flexible bearing element with an essentially matrix-type fibrous structure is arranged.

10 Claims, 2 Drawing Sheets

Figure 1:
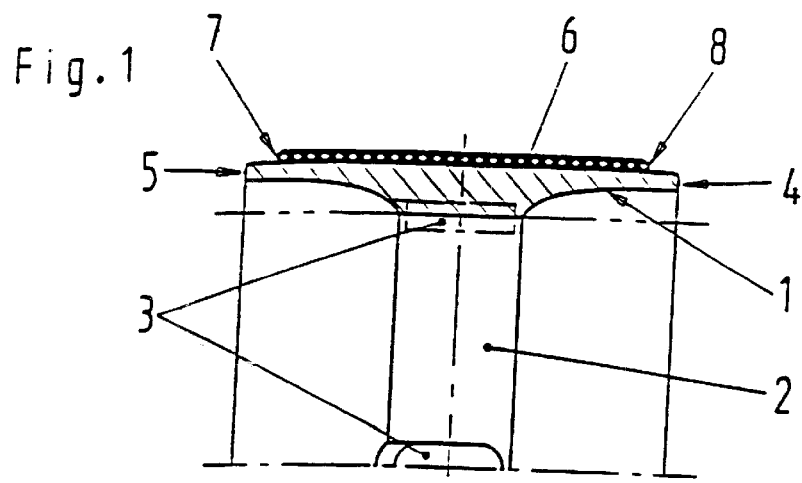

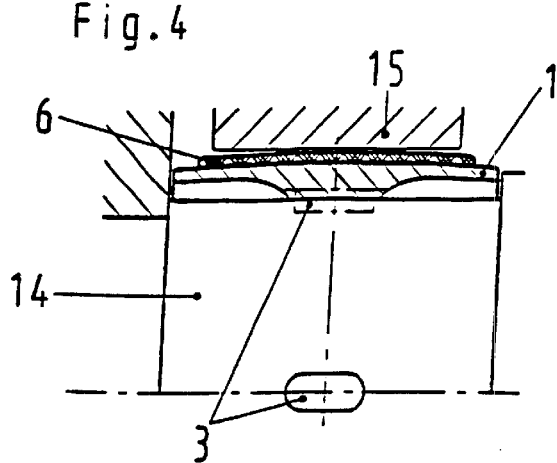
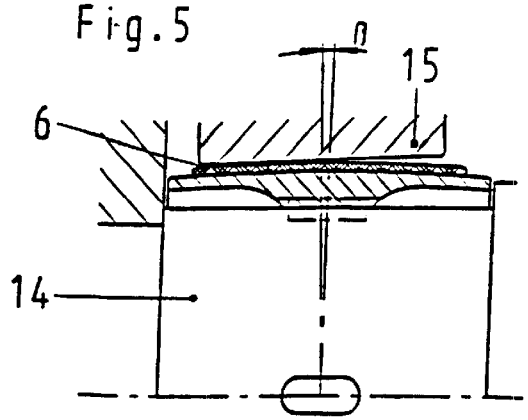
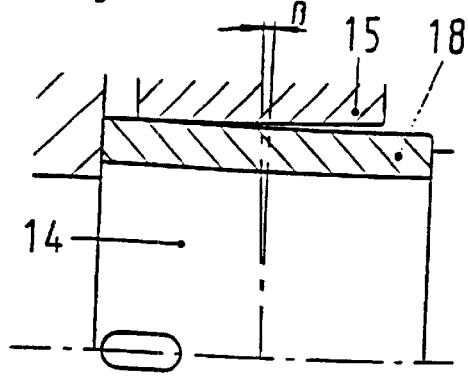
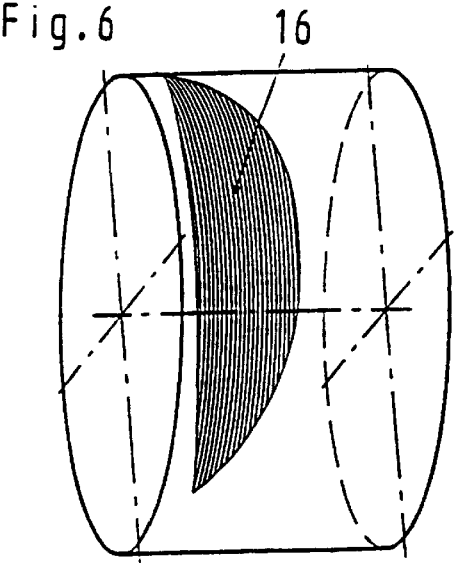
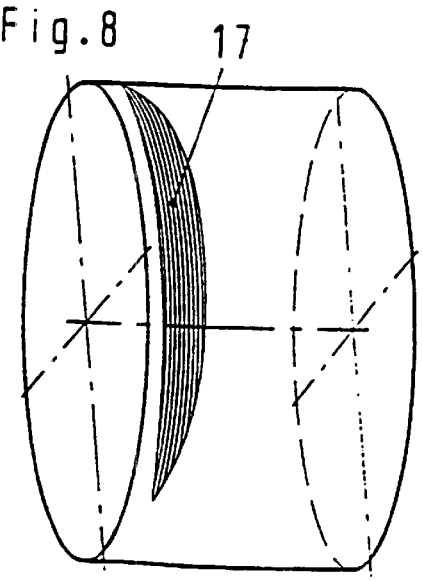

RADIAL BEARING WITH A SLIDING BEARING-TYPE CONSTRUCTION

BACKGROUND OF THE INVENTION

The invention relates to a radial bearing of the sliding-bearing type, in particular for use in centrifugal pumps, with a bearing sleeve arranged on a rotating shaft part and designed to transmit torque, the bearing sleeve being arranged rotatably within a bearing bush, and a gap for a low-viscosity lubricating medium being located between the parts sliding on one another.

Various embodiments of shaft mountings are known in centrifugal pumps, different bearing materials being used, depending on the feed medium. Ceramic bearing materials have proved particularly advantageous in bearings which are lubricated with a low-viscosity feed medium, for example with water or alcohol. A disadvantage of ceramic bearings of this type is their sensitivity to overheating due to deficient lubrication and jolt-like loads. Such sensitivity occurs in the region of mixed friction, for example when the sliding faces touch one another as a result of radial loads which are too high. At the same time, thermal-stress cracks may be formed within the ceramic due to an excessive local introduction of frictional heat into the ceramic surfaces. This gives rise to the risk of local pronounced material overload, with the result that cracks or spalling occur on the ceramic part and consequential damage is to be expected.

An additional load acts on such a mounting consisting of a stationary bearing bush and of a rotating bearing sleeve, when an angular offset arises between these parts. For example, it is known from DE-A-1528640, in such mountings, to arrange the bearing bush elastically relative to a housing by means of O-rings, in order to achieve easy moveability.

In the case of large multi-stage pumps or long shafts with bearings arranged between them, for example in large feed pumps, borehole shaft pumps or cantilevered mountings with a shaft overhang on one side, inclinations or deflections of the shaft occur as a result of the forces which prevail during operation. As a result, the bearing sleeve rotating together with the shaft likewise assumes an inclination. A one-sided bearing load resulting from this constitutes a further risk to ceramic bearings which are sensitive to impact or jolt loads.

SUMMARY OF THE INVENTION

The problem on which the invention is based is, therefore, to develop a shaft mounting which uses break-sensitive materials and which allows an angular offset occurring in the mounting.

This problem is solved in that the bearing sleeve consists of a carrying element and of a bearing element fastened to the latter, in that a fibrous structure arranged predominantly in a matrix-like manner and having ceramic particles or carbon particles arranged in it forms the bearing element, in that a ceramic or carbon matrix forms the fibrous structure, in that the carrying element is provided with different wall thicknesses in the region of bearing contact of the bearing element, and in that the carrying element is designed to be equal to or longer than the bearing element.

As seen in longitudinal section, the carrying element has a wall-thickness profile which is at a maximum in the middle region and is configured to decrease from the latter toward both sides. The ceramic or carbon-containing bearing element having a predominant matrix-like fibrous structure is pressed with a shrink fit or press fit onto the carrying element. The dimensions and tolerances of the individual parts are selected such that, under the effects of temperature, the bearing element remains firmly connected to the carrying element. The combination of such a bearing element with a carrying element having elasticity affords the advantage that, when an angular offset occurs, the two parts react in an elastically resilient manner and therefore the risk of a break on the bearing element is prevented. In contrast to a monolithic component, the fibrous structure, which is arranged in a predominantly matrix-like manner and is designed as a ceramic or carbon matrix into which ceramic or carbon particles are embedded, has resilience with respect to bending loads. At the same time, depending on the desired bearing pairing, both ceramic particles and carbon particles may be arranged in a carbon matrix. The same also applies to a ceramic matrix.

Thus, a property more resistant to tensile stresses occurring under bending loads can be produced on such bearing elements which are per se break-sensitive and are made as sintered parts. The tensile stresses occurring under bending load in a sleeve cross section of such a bearing element and risking a break are improved by the factor 10, as compared with a pure sintered material, by means of the fibers arranged in a matrix-like manner. The angular deviations of the mounting can consequently be compensated.

If the bearing element is connected to the carrying element by means of a shrinkage connection, the shrinkage forces of the bearing element cause the formation of a slightly convex shape in the assembled state. Since, according to one embodiment of the invention, the carrying element has a substantially smaller wall thickness in the region in which the ends of the bearing element are located than in the middle region of the latter, the shrinkage forces cause a reduction in diameter in the region of the smaller wall thicknesses. A shrunk-on bearing bush with its fibrous structure composed predominantly in a matrix-like manner, for example consisting of silicon carbide fibers or carbon fibers, therefore has a slightly convexly formed surface which is conducive to the compensation of angular deviations of a shaft mounting equipped with it. The combination of the bearing element equipped with a matrix-like fibrous structure with the carrying element, the shape of which leads to a spring characteristic curve about the radial axis, ensures an elasticity which compensates angular errors. In the case of pressed-on bearing elements, only the elastic resilience ensures the compensation of angular deviations.

Further embodiments of the invention are described in the subclaims. The feature whereby the end faces of the carrying element project beyond the end faces of the bearing element reduces the occurrence of stress peaks and allows the spring characteristic curve to be influenced positively. By virtue of a free space being arranged between the shaft and the carrying element in the region of one or both end faces of the bearing element, space is provided for the elastic compensation of angular errors.

The carrying element and the bearing element fastened to it form the rotating part of the radial bearing, the bearing sleeve. In a middle region of the bearing element, the carrying element has a wall-thickness maximum, the dimensions being selected such that reliable force transmission is thereby ensured. Furthermore, the region of the wall-thickness maximum serves for receiving means transmitting rotational movements between the shaft and carrying element. Wall-thickness minima are provided on the carrying element in the region of the end faces of the bearing element.

These minima are conducive to the spring effect of the carrying element and to the formation of a convex shape of the bearing face.

At least one thick-walled end portion led up to the shaft may be provided in the region of the end faces of the carrying element, this end portion being arranged at a distance from the end face of the bearing element. In between, the wall of the carrying element is designed as an elastically resilient thin-walled portion. The thick-walled end portion arranged in the region of the end face of the carrying element may also have torque-transmitting or force-transmitting designs. For the bearing contact of the bearing element, the carrying element may have an end-face bearing surface.

DETAILED DESCRIPTION OF THE PREFERRED EMBODIMENTS

Figure 2:
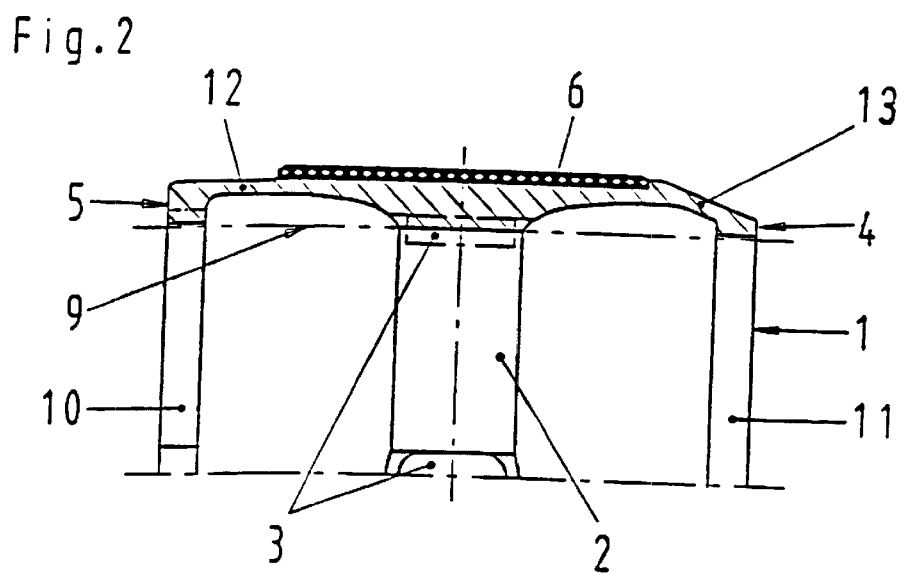
Figure 3:
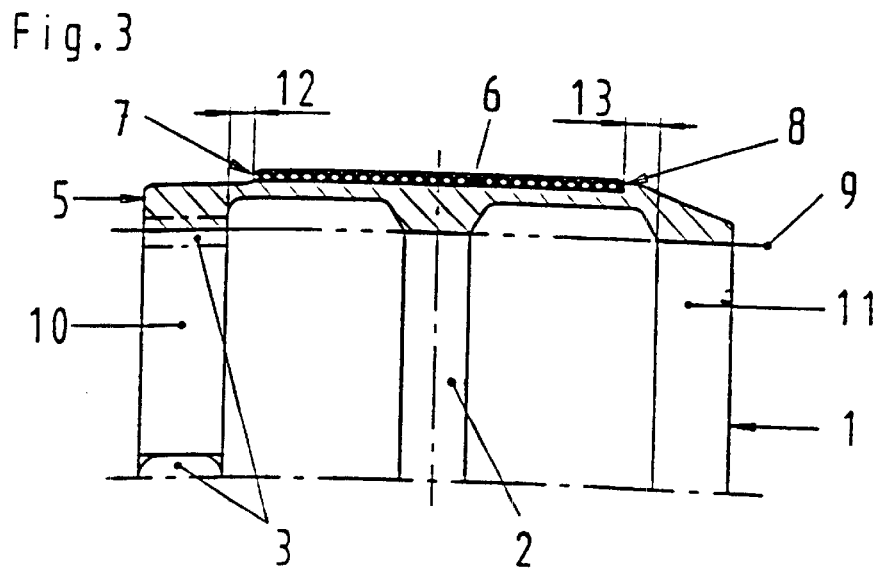

Embodiments of the invention are illustrated in the drawings and are described in more detail below. In the drawings:

FIGS. 1–3 show various embodiments of the carrying element,

FIG. 4 shows the arrangement of such a carrying element in a bearing without angular offset, FIGS. 5 and 6 show the arrangement of a carrying element when an angular offset occurs and an associated carrying diagram, and FIGS. 7 and 8 show illustrations similar to those of FIGS. 5 and 6 in the case of a conventionally designed mounting.

FIG. 1 shows, in longitudinal section, a carrying element 1 which may be of a metallic or non-metallic type and which is designed, in the middle region, as a portion 2 of maximum wall thickness. This portion 2 is designed for the transmission of torques and, for this purpose, uses known means 3, for example tongue-and-groove connections. The wall thickness of the carrying element 1 becomes increasingly smaller from the middle portion 2 toward the end faces 4, 5. Such a wall-thickness profile has a profile without sharp-edged transitions. Fastened to the outside diameter of the carrying element 1 is a bearing element 6 which consists of a fibrous structure arranged predominantly in a matrix-like manner, a ceramic or carbon matrix forming the fibrous structure. Ceramic or carbon particles are embedded into the matrix. The axial length of the bearing element 6 is made equal to or shorter than the axial length of the carrying element 1. The end faces 7, 8 of the bearing element 6 are arranged so as to be set back relative to the end faces 4, 5 of the carrying element 1. Such a measure prevents the occurrence of stress peaks at the transition between these two parts.

The middle portion 2 of the carrying element 1 makes a web-like connection to the shaft. Starting from the portion 2, the wall thickness of the carrying element 1 is configured so as to decrease toward the end faces 4, 5. Such a shape, which provides a free space between a surface 9 of a shaft and the carrying element 1, can be produced in a simple way, for example by cutting machining.

FIGS. 2 and 3 show other embodiments which likewise ensure elastic properties of a bearing sleeve formed in this way. They may be used in the case of higher radial forces to be absorbed. The axial length of the carrying element 1 is increased, as compared with the embodiment of FIG. 1. In this case, the region of the end faces 4, 5 of the carrying element 1 was designed in such a way that an approximation to the surface 9 of a shaft, not illustrated, is made.

In FIG. 2, the surfaces 10, 11, located opposite the shaft surface 9, of the end faces 4, 5 of the carrying element 1 are arranged so as to form a gap. There is therefore the possibility of influencing a deflection of the carrying element 1, taking place under the influence of radial forces, by means of the clearance shown between the surfaces 10, 11 and the surface 9. By suitable selection of the dimensions for a clearance fit to be provided between these parts, it is possible in a simple way to limit deflection. A thin-walled portion 12, 13 of the carrying element 1, said portion being arranged between the end faces 7, 8 of the bearing element 6 and the end faces 4, 5 of the carrying element 1, ensures the resilience properties of a bearing sleeve, formed in this way, of a radial bearing. It is possible to produce a progressive spring characteristic curve by means of such a measure.

The illustration of FIG. 2 depicts on the right-hand side, in the region of the end face 4, a different profile of that end of the carrying element 1 which is located opposite a face 11 of the shaft surface 9. The transition 13 is depicted as being conical here, but other transitions in the form of arcs or the like are also possible. Such a configuration is advantageous during the mounting of such a bearing and makes it possible to introduce it more easily. In the illustration of FIG. 2, the end face 5 on the left-hand side is designed in such a way that the carrying element can be pushed over the means 3 necessary for torque transmission.

The modification of FIG. 3 provides torque-transmitting means 3 solely in the region of the end face 5 of the carrying element 1. In order to transmit the bearing forces acting on the bearing element 6, the carrying element 1 rests in the region 2, with the faces 10, 11, on the surface 9 of a shaft. It is essential, in this case, that there be a thin-walled portion 12, 13 between the end faces 7, 8, limiting the length of the bearing element 6, and the faces 10, 11 of the carrying element 1. As can also be seen in FIG. 2, such a portion ensures the resilience of such a unit.

The embodiments of FIGS. 1 to 3 show an identical length of the bearing element 6, but the invention is not restricted to these. Their advantages may also be achieved by means of other overall lengths of the bearing element 6.

FIG. 4 shows a mounted bearing version, using as an example the component of FIG. 1. A carrying element 1 is arranged on a shaft 14 so as to transmit torque by virtue of the means 3. A bearing element 6 shrunk onto the carrying element 1 cooperates with a bearing bush 15. It is shown how the end-face thin-walled ends of the carrying element 1 acquire a convex shape under the influence of the shrinkage forces and run toward the shaft 14. Furthermore, in conjunction with the wall-thickness profile which becomes thinner in the direction of the end face, elastic resilience becomes possible, thus ensuring the precondition for compensating an angular offset of the shaft 14 in relation to the bearing bush 15.

FIGS. 5 and 6 show a radial bearing according to the invention during the compensation of angular deviations. FIG. 5 shows a bearing sleeve which is inclined at the angle β relative to a stationary bearing bush 15 and consists of the carrying element 1 and bearing element 6 and which rotates together with a shaft 14. The accompanying perspective illustration of FIG. 6, a top view of a bearing sleeve deformed under the action of force, shows a large contact face 16. This is produced between the bearing bush 15 and the bearing element 6. As a result of the bearing element 6 assuming a convex shape which is formed under load, the deformation leads, in the case of a slight inclination, to an adaptation of the sliding faces resting against one another. By the bearing face 16 being enlarged, along with the same radial force, local surface pressure acting on the bearing element 6 is reduced to a considerable extent. Consequently, a radial bearing designed in this way is substantially less sensitive to jolt-like, impacting and frictional loads than a bearing consisting of rigid elements.

FIGS. 7 and 8 show a mounting according to the prior art in a similar way to the illustration in FIGS. 5 and 6. In the case of an angular offset β of a monolithic ceramic bearing sleeve 18, only the very narrow bearing face 17 shown in FIG. 8 is afforded when inclination occurs. In comparison with large-area bearing contact of the faces during operation without any inclination, an inclination causes a considerable reduction in the bearing face normally present. The radial force acting on the bearing is therefore distributed to a substantially smaller area. Consequently, the surface pressure acting on the bearing element and/or the local frictional output exceeds the permissible values. The monolithic bearing sleeves, used hitherto for such mountings, in the form of ceramic materials which, because of their break sensitivity, should not be either shrunk on or otherwise put under tensile stress, are overloaded in such an operating situation. Their intended use is therefore restricted considerably.

What is claimed is:

1. A radial bearing in the form of a friction bearing comprising a bearing sleeve arranged on a shaft and designed to transmit torque, said bearing sleeve being arranged rotatably within a bearing bush, and said bearing being provided with a gap for a low-viscosity lubricating medium between parts which slide on one another; said bearing sleeve comprising a support element and a bearing element attached to the support element; said bearing element comprising a fibrous ceramic or carbon matrix structure having ceramic or carbon particles disposed therein; said support element having varying wall thicknesses where it is attached to the bearing element, and said support element having a length at least equal to the bearing element.

2. A radial bearing according to claim 1, wherein said support element is longer than the bearing element and has axial end faces which project axially beyond axial end faces of the bearing element.

3. A radial bearing according to claim 2, wherein at least one free space is provided between said support element and a shaft surface adjacent the end faces of the bearing element.

4. A radial bearing according to claim 2, wherein said support element has a wall thickness which decreases from a maximum thickness in a central region thereof toward the axial end faces of the bearing element.

5. A radial bearing according to claim 4, wherein said support element has a region of maximum wall thickness adjacent a central region of said bearing element.

6. A radial bearing according to claim 3, further comprising force transmitting elements arranged in said central region of said support element.

7. A radial bearing according to claim 4, wherein said support element has regions of minimum wall thickness adjacent the axial end faces of said bearing element.

8. A radial bearing according to claim 1, wherein said support element has a thin-walled portion between each axial end face of the bearing element and a thick-walled axial end portion of the support element.

9. A radial bearing according to claim 1, wherein said bearing element lies against an axial surface of said support element.

10. In a centrifugal pump, the improvement comprising a radial bearing according to claim 1.

\* \* \* \* \*